(12) United States Patent
Yue et al.

(10) Patent No.: US 8,359,507 B2
(45) Date of Patent: Jan. 22, 2013

(54) SYSTEMS AND METHODS FOR ADAPTIVE HYBRID AUTOMATIC RETRANSMISSION REQUESTS

(75) Inventors: Guosen Yue, Plainsboro, NJ (US); Xiaodong Wang, New York, NY (US)

(73) Assignee: NEC Laboratories America, Inc., Princeton, NJ (US)

( * ) Notice: Subject to any disclaimer, the term of this patent is extended or adjusted under 35 U.S.C. 154(b) by 756 days.

(21) Appl. No.: 12/481,359

(22) Filed: Jun. 9, 2009

(65) Prior Publication Data

US 2009/0319855 A1 Dec. 24, 2009

Related U.S. Application Data

(60) Provisional application No. 61/074,714, filed on Jun. 23, 2008.

(51) Int. Cl.
*G08C 25/02* (2006.01)
*H04L 1/18* (2006.01)

(52) U.S. Cl. ..................................................... 714/748
(58) Field of Classification Search ........... 714/748–750
See application file for complete search history.

(56) References Cited

U.S. PATENT DOCUMENTS

| | | | | |
|---|---|---|---|---|
| 6,631,127 | B1 * | 10/2003 | Ahmed et al. | 370/349 |
| 7,385,954 | B2 * | 6/2008 | Gopalakrishnan et al. | 370/335 |
| 8,001,440 | B2 * | 8/2011 | Cho et al. | 714/748 |

* cited by examiner

*Primary Examiner* — Shelly A Chase
(74) *Attorney, Agent, or Firm* — Joseph Kolodka

(57) ABSTRACT

A turbo coded hybrid ARQ with both IR and repetition existing in one or more transmission blocks is designed. The mixed combining is performed at the receiver—Chase combining is performed for the repetitions first, followed by code combining for all code bits based on Chase combining outputs. The packet error probability is obtained by applying the union-Bhattacharyya (UB) bound for parallel channels. The throughput optimization of hybrid ARQ is determined as well as the optimal assignment rates by solving the optimization using a genetic algorithm.

18 Claims, 11 Drawing Sheets

SYSTEMS AND METHODS FOR ADAPTIVE HYBRID AUTOMATIC RETRANSMISSION REQUESTS

This application claims the benefit of U.S. Provisional Application No. 61/074,714 filed on Jun. 23, 2008, which is incorporated herein by reference.

BACKGROUND OF THE INVENTION

The present invention relates generally to adaptive incremental redundant (IR) hybrid automatic repeat request (ARQ) schemes and more particularly to improving throughput in wireless transmission systems using adaptive hybrid ARQ schemes with both incremental redundancy (IR) and Chase combining (CC).

In most wireless communication systems, the channels are time-varying. In order to maintain high throughput and reliability simultaneously over such time-varying channels, the forward error correction (FEC) codes can be employed with the use of automatic repeat-request (ARQ) schemes, such as a hybrid ARQ scheme. With hybrid ARQ, the receiver first uses FEC codes to correct the errors and triggers the retransmission when residual error is detected. A simple hybrid ARQ scheme is type-I hybrid ARQ, in which the receiver discards the previous transmission and performs the detection and decoding over the retransmitted signal only. Although this scheme saves the buffer size by discarding the previously received packet, it is not an efficient method in term of throughput.

Generally, two types of hybrid ARQ schemes are of particular interest in data packet systems—Chase combining and incremental redundancy (IR) hybrid ARQ (e.g., type-II hybrid ARQ). In the Chase combining scheme, the repeated coded sequence is sent to receiver upon the ARQ request. The receiver then combines received multiple copies of coded sequence using maximum ratio combining (MRC) for the detection. In type-II hybrid ARQ, additional parity bits are transmitted at each retransmission. The receiver performs the decoding using all received sequences since they belong to one codeword. With IR hybrid ARQ, the throughput performance is improved with a coding gain in additional to the diversity gain. Both Chase combining and IR hybrid ARQ schemes provide throughput gain over type-I hybrid ARQ with the expense of additional buffers and complexity at the receiver.

To achieve high throughput efficiency, both Chase combining and IR hybrid ARQ schemes have been adopted in practical wireless systems. They have also been included in recently established wireless standards. Hybrid ARQ can be classified as synchronous and asynchronous. In synchronous hybrid ARQ, the retransmissions are restricted to occur at known time instants. In asynchronous hybrid ARQ, the retransmissions may occur at any time. For asynchronous hybrid ARQ, additional signaling of ARQ process number is required.

In terms of transmission attributes, the hybrid ARQ can be further classified as adaptive and non-adaptive. In adaptive hybrid ARQ, the transmitter may change the attributes at each retransmission including the modulation, coding rate, resource block allocation, etc. In non-adaptive hybrid ARQ, the modulation, coding rate, and the allocated resource block for retransmissions is the same as the original transmission.

Present, existing solutions have considered non-adaptive hybrid ARQ. That is, the block length and modulation in each retransmission is assumed to be the same as that in the original transmission. For adaptive hybrid ARQ, the conventional solutions only consider the binary coded system without employing the discrete quadrature amplitude modulation (QAM).

Accordingly, improved systems and methods for improving throughput in adaptive IR hybrid ARQ wireless transmission systems are required.

BRIEF SUMMARY OF THE INVENTION

The present invention generally provides a method of packet transmission in a wireless adaptive hybrid automatic repeat request transmission system with both IR and Chase combining. An optimized assignment rate for a packet is determined based at least in part on a maximal number of transmission attempts and a long term signal to noise ration of the wireless transmission system, an optimized quadrature amplitude modulation set is determined for the packet based at least in part on the maximal number of transmission attempts and the long term signal to noise ration of the wireless transmission system, and information related to the packet is transmitted based at least in part on the determined optimized assignment rate and determined optimized quadrature amplitude modulation set.

In one embodiment, an optimized assignment rate and throughput is determined for the modulation set using an iterative process. The iterative process includes determining a modulation candidate from the modulation set, determining a number of randomized candidates, a maximal iteration number, and a step size, and determining an optimal assignment rate and throughput for the modulation set using the iterative process. The iterative process also includes generating a set of candidate assignment rates equal to the determined number of randomized candidates, determining the error rates of the candidate assignment rates, determining the throughput of the candidate assignment rates, determining the optimal assignment rate and throughput, determining if the maximal iteration number has been reached, and if the maximal iteration number has not been reached, repeating iterative process. Then, the determined optimal assignment rate and determined throughput are output.

The packet error rates of retransmissions are obtained based on the bucket filling analysis for the hybrid ARQ process with mixed IR and repetitions. Mixed Chase and code combining are applied. That is, mixed combining is performed at the receiver in at least one embodiment of the present invention. First, intra-block Chase combining (CC) is performed. For each transmission pre-demodulation maximum ratio combining (MRC) is performed for the symbol repetitions in that transmission. Pre-demodulation CC for two portions (a main portion and a residual portion) of the codeword is used. That is, MRC is used for $\Lambda_I+1$ copies of $\epsilon_1$ portions of the codeword. Then, inter-block CC is performed. That is, MRC is then used for $\Lambda_I$ copies of the remaining $(1-\epsilon_i)$ portion of the codeword. For all I transmissions, a determination is made as to whether there are any coded bits repeated among different transmissions. If modulations for the repetitions among any I transmissions are the same, pre-demodulation MRC is performed for all i transmissions. Post-demodulation bit combining is then used for all repeated bits in different transmissions with different modulations. Joint decoding is then performed for both parts as one turbo codeword. That is, the message is decoded in one decoder using Chase combining and demodulation outputs.

These and other advantages of the invention will be apparent to those of ordinary skill in the art by reference to the following detailed description and the accompanying drawings.

DETAILED DESCRIPTION

The present invention is generally related to the use of adaptive hybrid automatic repeat request (ARQ) methods with mixed incremental redundancy (IR) and Chase combining (CC) to improve the system throughput.

Figure 1:
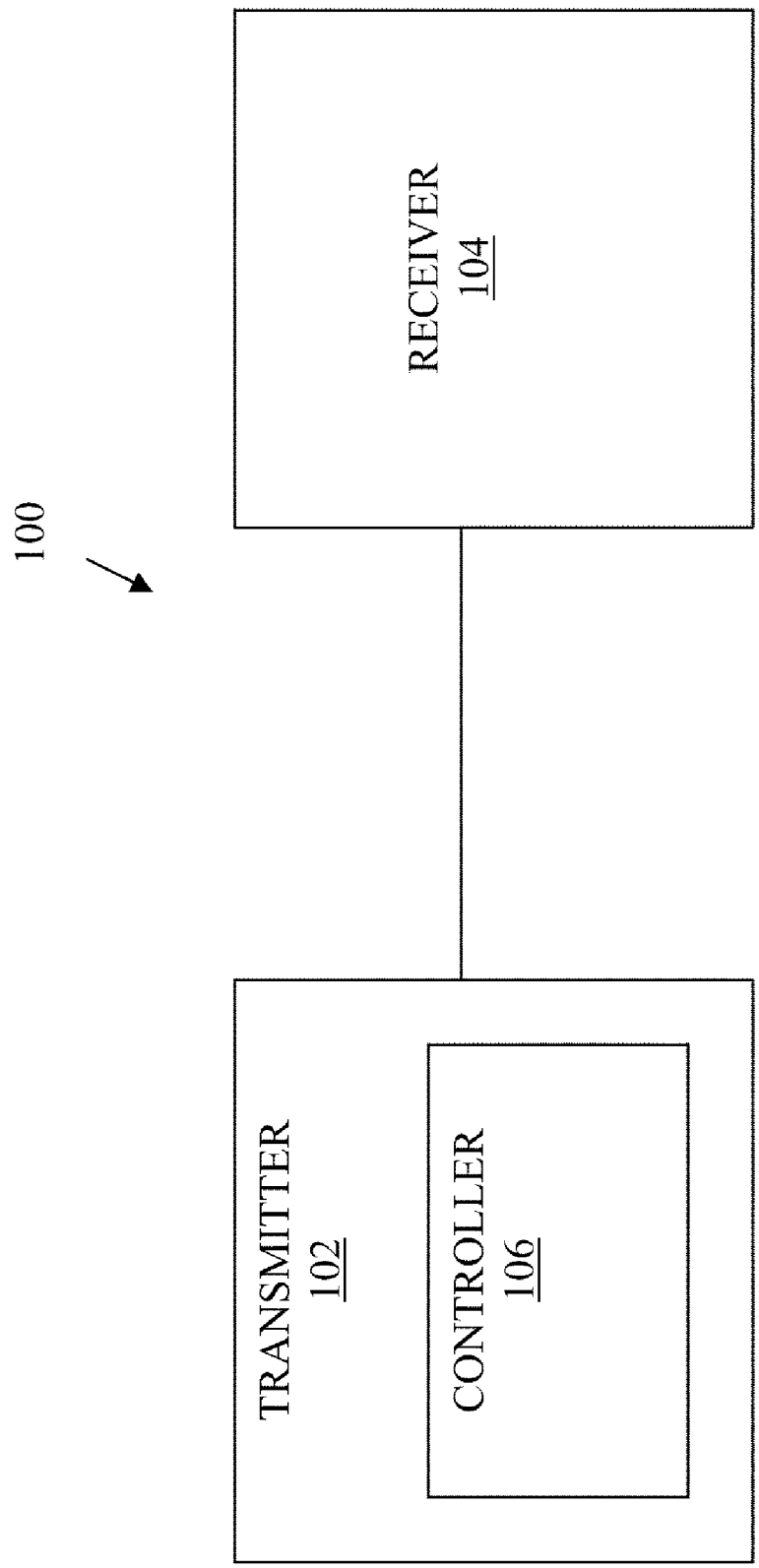
FIG. 1 depicts wireless transmission system according to an embodiment of the present invention

FIG. 1 depicts wireless transmission system 100 according to an embodiment of the present invention. The system 100 comprises a transmitter 102 and one or more receivers 104. Transmitter 102 may be adapted to transmit signals (e.g., wireless communication signals, frames, blocks, symbols, sequences, symbol sequences, etc.) over one or more channels (e.g., parallel logic channels, data channels, etc.). Receiver 104 may be adapted to receive and/or process signals received from the transmitter 102. The system 100 may also a controller 106 which each may be in communication with transmitter 102 and/or receiver 104. Transmission system 100, via transmitter 102 and receiver 104 may also have one or more backward (e.g., feedback) channels to transfer information (e.g., an ACK, a NACK, a retransmission request, etc.) transmitted from the receiver 104 to the transmitter 102 and/or the controller 106.

Transmitter 102 and receiver 104 may be implemented using any appropriate transmitters and receivers adapted to perform the methods described below. One skilled in the art would recognize that system 100 would have other components as well. It is understood that any appropriate combination of these components may be used to implement the invention as described herein. For example, the method steps of methods 700, 800, 900, 1000, and/or 1100 may be employed on, by, or at any combination of controller 106, transmitter 102, the receiver 104, and/or any other device in the system 100.

Transmitter 102, generally, and controller 106, specifically, may include a modulator, encoder, and/or assigner as described below with respect to FIGS. 3-5. That is, transmitter 102 and/or controller 106 may be adapted to assign rates, modulate signals, and/or encode information as discussed below in greater detail—specifically with respect to FIGS. 7-9.

In some embodiments, controller 106 may be or may include any components or devices which are typically used by, or used in connection with, a computer or computer system. Although not explicitly pictured in FIG. 1, the controller 106 may include one or more central processing units, read only memory (ROM) devices and/or random access memory (RAM) devices. The controller 106 may also include input devices such as a keyboard and/or a mouse or other pointing device, and output devices such as a printer or other device via which data and/or information may be obtained, and/or a display device such as a monitor for displaying information to a user or operator. The controller 106 may also include a transmitter and/or a receiver such as a LAN adapter or communications port for facilitating communication with other system components and/or in a network environment, one or more databases for storing any appropriate data and/or information, one or more programs or sets of instructions for executing methods of the present invention, and/or any other computer components or systems, including any peripheral devices.

According to some embodiments of the present invention, instructions of a program (e.g., controller software) may be read into a memory of the controller 106 from another medium, such as from a ROM device to a RAM device or from a LAN adapter to a RAM device. Execution of sequences of the instructions in the program may cause the controller 106 to perform one or more of the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory may store the software for the controller which may be adapted to execute the software program, and thereby operate in accordance with the present invention, and particularly in accordance with the methods described in detail below. However, it would be understood by one of ordinary skill in the art that the invention as described herein can be implemented in many different ways using a wide range of programming techniques as well as general purpose hardware sub-systems or dedicated controllers.

The program may be stored in a compressed, uncompiled and/or encrypted format. The program furthermore may include program elements that may be generally useful, such as an operating system, a database management system and device drivers for allowing the controller to interface with computer peripheral devices and other equipment/components. Appropriate general purpose program elements are known to those skilled in the art, and need not be described in detail herein.

As indicated herein, the controller 106 may assign rates, modulate signals, and/or encode information. As will be understood by those skilled in the art, the schematic illustrations and accompanying descriptions of the structures and relationships presented herein are merely exemplary arrangements. Any number of other arrangements may be employed besides those suggested by the illustrations provided.

Figure 2:
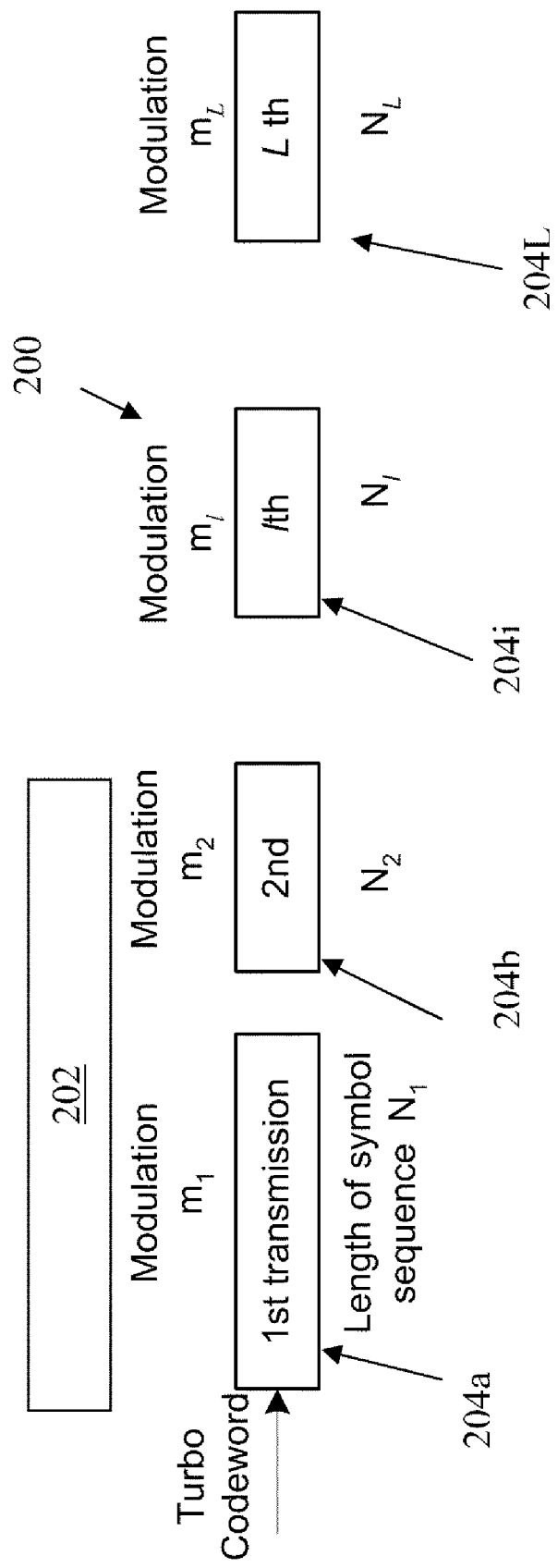
FIG. 2 depicts a general adaptive hybrid ARQ process for turbo coded system with QAM modulations.

FIG. 2 depicts a general adaptive hybrid ARQ process 200 for turbo coded system with QAM modulations. A length-K information sequence 202 is encoded for transmission (e.g., by transmitter 102 of FIG. 1) as one or more blocks 204a-204L. A symbol sequence with length $N_1$ is transmitted in the first block 204a. After the receiver (e.g., receiver 104) fails to decode the sequence, a NACK is sent back to the transmitter 102 along with a request for retransmission. The transmitter 102 then sends the additional coded sequence carrying the original information again with block length $N_2$. Upon request, the transmitter 102 keeps transmitting the coded sequence carrying the original information with block length $N_3$, $N_4$, ..., until the receiver 104 successfully decodes the message with an ACK feedback, or the maximal number of transmissions L (e.g., block 204L) is reached. The average transmission rate after the $l^{th}$ transmission is then given by $$R_l = \frac{K}{\sum_{i}^{l} N_i}, l = 1, \ldots, L.$$

In other words, a block of K information bits are first encoded by a rate $r_0 = K/n$ turbo code. Based on the rate allocation, the coded bits are interleaved and randomly selected with $n_1 = \lambda_1 n$ bits, where $\lambda_1$ denotes the assignment rate of the 1st transmission. The length-$n_1$ binary sequence is then modulated using a $M_1$-QAM constellation set into a block of $N_1 = n_1/\log_2(M_1)$ symbols. If decoding fails at the receiver, upon the ARQ request, the turbo coded bits are then randomly selected with $n_2 = \lambda_2 n$ bits and modulated to $N_2 = n_2/\log_2(M_2)$ QAM symbols using a $M_2$-QAM constellation set for the second transmission. If the receiver fails to decode the message again, the coded sequence is transmitted carrying the original information with block length $N_3 = n_3/\log_2(M_3)$, $N_4 = n_4/\log_2(M_4)$, and so on, until the receiver successfully decodes the message with an ACK sent to the transmitter, or the maximal number of transmissions L is reached.

Practical implementation of the present adaptive hybrid ARQ may include two parts, the mixed transmission at the transmitter end and the mixed combining at the receiver end. The mixed transmission at the transmission is described below with respect to FIG. 3. During the transmission, based on the SNR P, and maximal number of transmissions L in hybrid ARQ process, the transmitter 102 selects the optimal rates to transmit. For a practical wireless system employing binary code and discrete modulations, the optimal assignment rates and modulation set are obtained and transmit the modulated sequences accordingly.

The coded bits transmitted in a certain block can be repetitions from previous transmissions, different coded bits, or both. Thus, the summation $\Sigma_{l=1}^{L} \lambda_l$ can be greater than one. Therefore, no constraint for the sum of $\lambda_l$ is considered here. More than one codeword may be transmitted in one transmission. That is, it is possible that $\lambda_l > 1$. At the receiver 104, Chase combining is performed for the repetitions and joint decoding is performed for the incremental redundancies. When both cases exist in one hybrid ARQ process, mixed combining is performed for all transmissions.

Here, $\epsilon_l$ is the decoding error event after the $l^{th}$ transmission. The probability of decoding error after the $l^{th}$ transmission is $$p(l) \triangleq Pr(\varepsilon_1, \varepsilon_2, \ldots, \varepsilon_{l-1}, \varepsilon_l).$$

Based on this:

$$\eta = \frac{E\{R\}}{E\{T\}}$$

where $\Re$ is a random reward—the transmitted information when the HARQ process stops after decoding, for example. Based on the renewal-reward theorem, the throughput of the HARQ is given as $$\eta = \frac{E\{\Re\}}{E\{T\}},$$

where T denotes the random transmission time for two consecutive occurrences of the recurrent event (inter-renewal time), e.g. the transmitted block length for each hybrid ARQ process. Given the information block length K and maximal number of transmissions in one hybrid ARQ process L, from the above, the throughput for HARQ is given by:

$$\eta = \frac{K(1 - p(L))}{\sum_{l=1}^{L-1} \left(\sum_{i=1}^{l} N_i\right)(p(l-1) - p(l)) + p(L-1)\sum_{i=1}^{L} N_i}$$

$$= \frac{1 - p(L)}{\sum_{l=1}^{L} \frac{1}{R_l(p(l-1) - p(l)) + \frac{p(L-1)}{R_L}}}$$

This may be simplified by defining the effective rate as $$r_l \triangleq \frac{K}{N_l}, l = 1, \ldots, L$$

giving $$\eta = \frac{K(1 - p(L))}{\sum_{l=1}^{L} N_l p(l-1)} = \frac{1 - p(L)}{\sum_{l=1}^{L} \frac{1}{r_l} p(l-1)} = \frac{1 - p(L)}{\frac{1}{r_1} + \sum_{l=1}^{L-1} \frac{1}{r_{l+1}} p(l)}.$$

For turbo coded HARQ with discrete QAM modulations, the effective transmission rate $r_l$ is $$r_l = \frac{K}{(\lambda_l n)/(2m_l)} = \frac{2m_l r_0}{\lambda_l}, l = 1, \ldots, L.$$

and the throughput for the turbo codes hybrid ARQ is $$\eta_{TC} = \frac{(1 - p(L))r_0}{\frac{\lambda_1}{2m_1} + \sum_{l=1}^{L-1} \frac{\lambda_{l+1}}{2m_{l+1}} p(l)}.$$

Here, mixed transmission is used at the transmitter 102 and mixed combining is used at the receiver 104.

The hybrid ARQ process can be treated as the coded bits transmitted through L parallel channels. Based on some parallel-channel bounds, the error probabilities $\{p(l)\}$ are then obtained. The union-Bhattacharyya (UB) bound is used for turbo coded hybrid ARQ. The Bhattacharyya noise parameter γ characterizes the noisiness of the channel, which is defined as $$\gamma \triangleq \sqrt{p(y|0)p(y|1)}dy,$$

where p(y|b),b=±1 denotes the channel transition probabilities with binary input b. C is the turbo code ensemble, which is a set of turbo codes formed by the same component codes but with different interleavers. The threshold of the turbo code ensemble is then defined by $$C_o^{[C]} \triangleq \limsup_{n \to \infty} \max_{D_n < h \leq n} \frac{\ln \overline{A}_n^{[C_n]}}{h} \text{ where } \overline{A}_h^{[C_n]}$$

is the average weight enumerator (AWE). The AWE is the average number of codewords with weight h, and $D_n$ denotes a sequence of numbers such that $$D_n \infty \text{ and } \frac{D_n}{n^\epsilon} \to 0 \forall_\epsilon > 0.$$

For a turbo code ensemble [C] of mother rate $r_0$ transmitted through I orthogonal blocks with the modulation set $S_i$ with $M_i$ symbols and $m_i=\frac{1}{2}\log_2(M_i)$, i=1, ..., l. The average ML decoding word error probability of the turbo coded hybrid ARQ goes to zero if $\overline{\gamma}_I(\{\lambda_i, g_i, m_i\}_{i=1}^I, P) < \exp(-c_0^{[C]})$, where $\overline{\gamma}_I(\{\lambda_i, g_i, m_i\}_{i=1}^I, P)$ is the average noise parameter for I transmission, which is a function of $\{\lambda_i, g_i, m_i\}_{i=1}^I$ and P. The error probability p(I) can then be obtained as p(I)=Pr($\overline{\gamma}_I > \exp(-c_0^{[C]})$).

Figure 3:
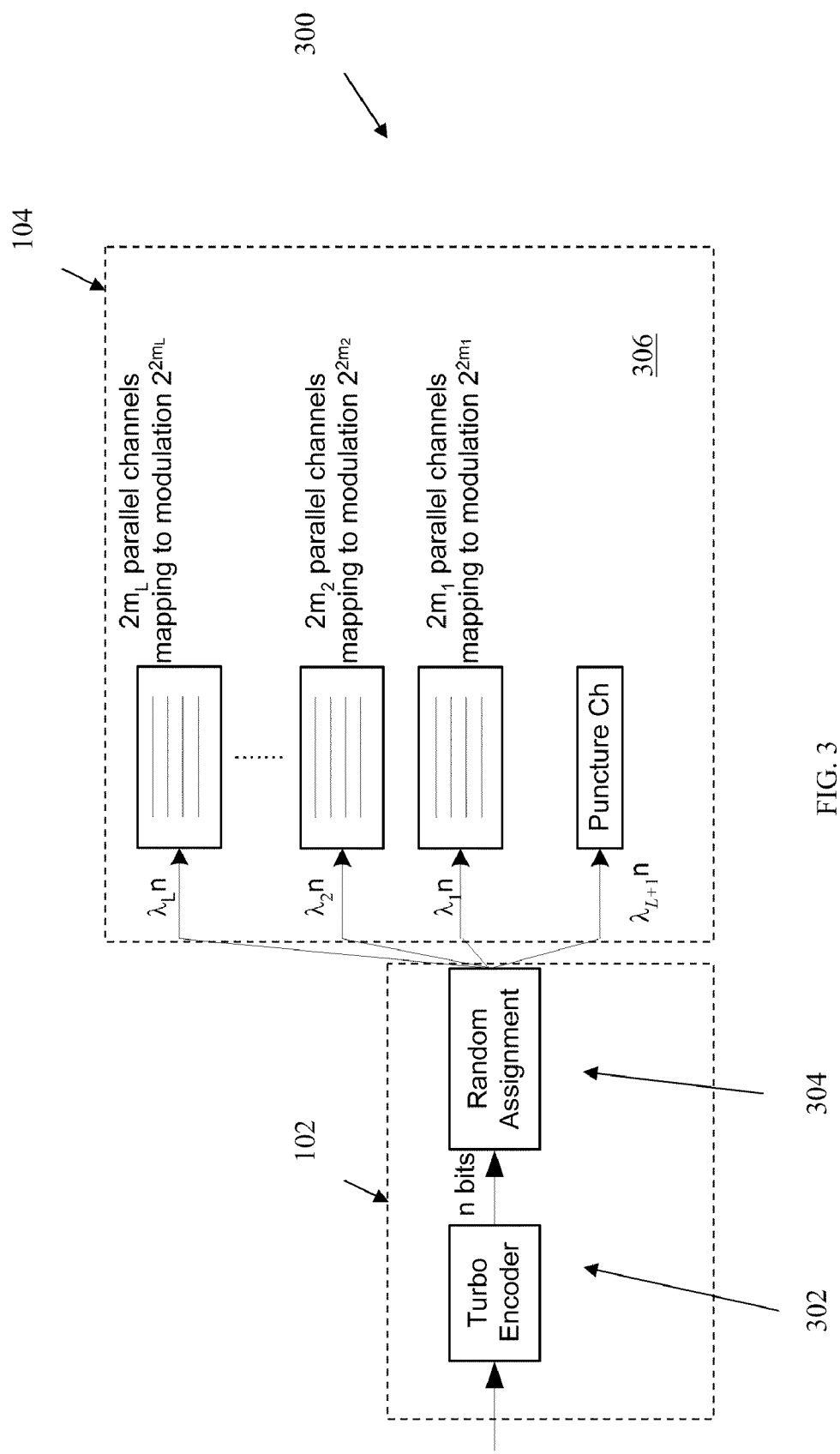
FIG. 3 depicts an equivalent parallel channel model for adaptive IR HARQ in turbo BICM with random puncturing according to an embodiment of the present invention.

FIG. 3 depicts an equivalent parallel channel model 300 for adaptive IR HARQ in turbo BICM with random puncturing. System model 300 is further elucidation of wireless transmission system 100 according to an embodiment of the present invention. Transmitter 102 includes a turbo encoder 302 and a rate assigner 304. Transmitter 102 transmits over a plurality of parallel channels. Receiver 104 receives information over the parallel channels and employs turbo decoder 306.

Figure 4:
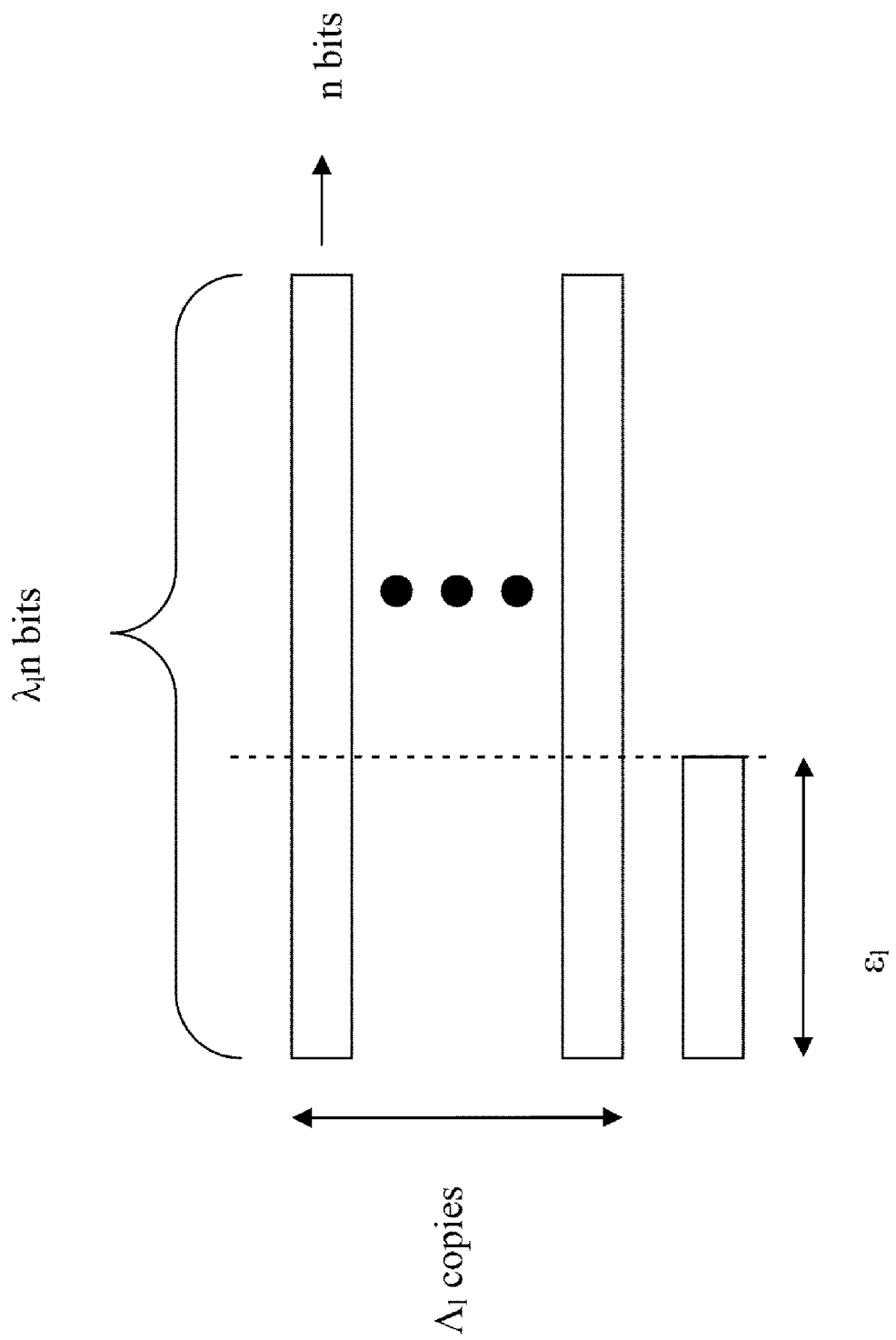
FIG. 4 depicts mixed combining in a single transmission block of the hybrid ARQ process according to an embodiment of the present invention.

FIG. 4 depicts mixed combining in a single transmission block of the hybrid ARQ process described herein. $\lambda_l n$ bits are transmitted in the $I^{th}$ transmission block. $\lambda_l$ is broken into two parts—the integer part $\Lambda_l$ and the residue part $\epsilon_l$. Thus, $$\lambda_l = \Lambda_l + \epsilon_l,$$

where $\Lambda_l = \lfloor \lambda_l \rfloor$, $\epsilon_l = \lambda_l - \Lambda_l$.

$\lambda_l n$ bits contain $\Lambda_l$ full codewords and $\epsilon_l$ parts of a codeword. For that $\epsilon_l$ part of coded bits, there are total $\Lambda_l+1$ copies received at the receiver 104. For the rest of coded bits, there are a total of $\Lambda_l$ copies. At the receiver 104, two-step decoding is performed as described below.

Pre-demodulation CC is performed for two portions of a codeword. That is, maximum ratio combining is performed for $\Lambda_l+1$ copies of the $\epsilon_l$ portion of the codeword and maximum ratio combining is then performed for $\Lambda_l$ for the remainder of the codeword. Given a $2^{2m_l}$-QAM modulation and an average receive power P, based on the decoding method described above, the average Bhattacharyya noise for the Ith transmission alone is $$\overline{\gamma}(l) = \frac{\epsilon_l}{m_l}\sum_{q=1}^{m_l}\gamma_{q,l}((\Lambda_l+1)g_l P) + \frac{1-\epsilon_l}{m_l}\sum_{q=1}^{m_l}\gamma_{q,l}(\Lambda_l g_l P)$$

where $\gamma_{q,l}$ can be obtained from $$\gamma_{q,i} = \int \sqrt{\frac{1}{2^{m-1}}\sum_{x \in S_{i,0}^q} p(y|x) \frac{1}{2^{m-1}}\sum_{x \in S_{i,1}^q} p(y|x)} \, dy.$$

Figure 5:
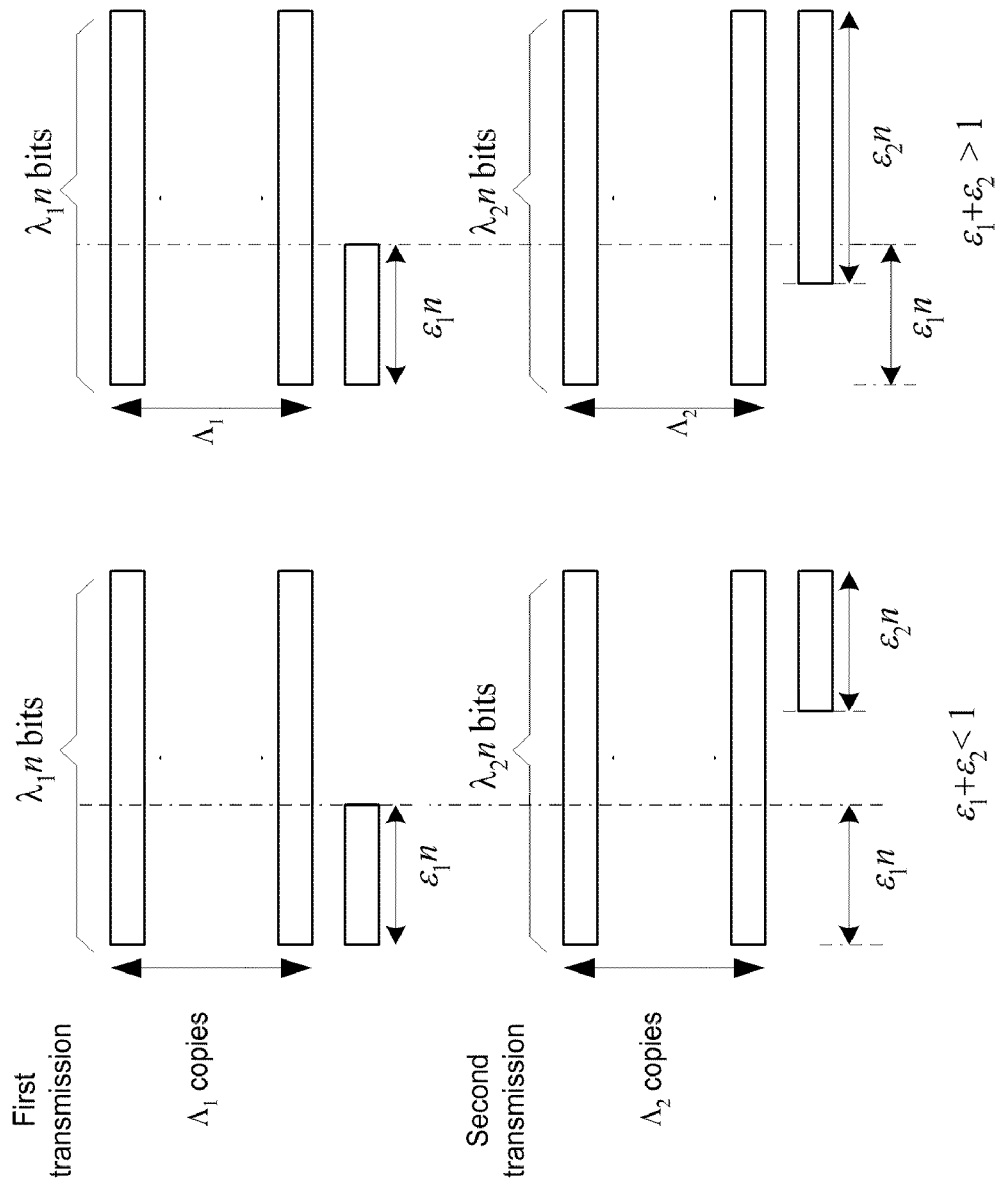
FIG. 5 depicts mixed combining for two transmission blocks according to an embodiment of the present invention.

Similar to FIG. 4, FIG. 5 depicts mixed combining for a number (e.g., L) of transmission blocks. In the exemplary embodiment of FIG. 5, mixed combining in two transmission blocks is shown. Of course, mixed combining may be generalized to any number (e.g., L) transmission blocks.

Similar to the mixed combining for one transmission block, $\Lambda_1$, $\epsilon_1$ and $\Lambda_2$, $\epsilon_2$ are obtained. There are two cases for two transmissions—the case with $\epsilon_1+\epsilon_2<1$ and the case with $\epsilon_1+\epsilon_2>1$. Based on the above bucket-filling assumptions, for both cases the codeword can be divided into three parts.

When $\epsilon_1+\epsilon_2<1$, the first part is the $\epsilon_1$ portion of the codeword which has $\Lambda_1+1$ copies transmitted through the first block and has $\Lambda_2$ copies through the second block. The second part contains the $\epsilon_2$ portion of the codeword which has $\Lambda_1$ copies transmitted through the first block and has $\Lambda_2+1$ copies through the second block. The third part has $(1-\epsilon_1-\epsilon_2)$ portions of the codeword which has $\Lambda_1$ copies transmitted through the first block and has $\Lambda_2$ copies through the second block.

For each part, pre-demodulation MRC is used through each transmission block based on the number of copies received in that block. Bit level post-demodulation CC for the MRC outputs is used in two transmissions if the modulations are different. If the modulations in two transmissions are the same, pre-demodulation MRC combining is used for all the copies. After having the Chase combining for all three parts, the average noise parameter for two transmissions with IR code combining is $\overline{\gamma}_2 = \epsilon_1 \overline{\gamma}_2^{(1)} + \epsilon_2 \overline{\gamma}_2^{(2)} + \delta \overline{\gamma}_2^{(3)}$ where $\delta=1-\epsilon_1-\epsilon_2$; $\overline{\gamma}_2^{(1)}$, $\overline{\gamma}_2^{(2)}$, and $\overline{\gamma}_2^{(3)}$ are the average noise parameters for the three parts of the codeword given by $$\overline{\gamma}_2^{(1)} = f_{\gamma CC}(\overline{\gamma}_{BICM}((\Lambda_1+1)g_1 P), \overline{\gamma}_{BICM}(\Lambda_2 g_2 P))$$

$$\overline{\gamma}_2^{(2)} = f_{\gamma CC}(\overline{\gamma}_{BICM}(\Lambda_1 g_1 P), \overline{\gamma}_{BICM}((\Lambda_2+1)g_2 P)) \text{ where}$$

$$\overline{\gamma}_2^{(3)} = f_{\gamma CC}(\overline{\gamma}_{BICM}(\Lambda_1 g_1 P), \overline{\gamma}_{BICM}(\Lambda_2 g_2 P))$$

$f_{\gamma CC}(\overline{\gamma}_{BICM}(P_1), \overline{\gamma}_{BICM}(P_2))$ is the function for computing the noise parameter from the CC for two transmissions. If the modulations used in the two transmissions are the same, pre-demodulation MRC can be applied for both transmission as $$f\gamma_{CC}(\overline{\gamma}_{BICM}(P_1), \overline{\gamma}_{BICM}(P_2)) \triangleq \overline{\gamma}_{BICM}(P_1+P_2),$$

where $$\overline{\gamma}_{BICM} = \frac{1}{m_l}\sum_{q=1}^{m}\gamma_q.$$

If the modulations are different, the post-demodulation CC is performed at the bit level. In some embodiments, an approximation is used to perform the post-demodulation CC.

Two transmission blocks are treated as two parallel memoryless channels. The average output noise parameter of these two channels with any channel statistics can be approximated by the combining output for two parallel Gaussian channels with the same Bhattacharyya noise parameter for each channel. Since, for Gaussian channels, the noise parameter $\gamma=e^{-SNR}$. The combining of two Gaussian channels with SNR $P_1$, $P_2$, is given by $\bar{\gamma}=e^{-(P_1+P_2)}=\gamma_1\gamma_2$. The average noise $$\bar{\gamma}_2^{(1)}=\int_{\gamma CC}(\bar{\gamma}_{BICM}((\Lambda_1+1)g_1P),\bar{\gamma}_{BICM}(\Lambda_2g_2P))$$

parameter of $\bar{\gamma}_2^{(2)}=\int_{\gamma CC}(\bar{\gamma}_{BICM}(\Lambda_1g_1P),\bar{\gamma}_{BICM}((\Lambda_2+1)g_2P))$ after bit level Chase $$\bar{\gamma}_2^{(3)}=\sim_{\gamma CC}(\bar{\gamma}_{BICM}(\Lambda_1g_1P),\bar{\gamma}_{BICM}(\Lambda_2g_2P))$$

combining can be approximated as $$\int_{\gamma CC}(\bar{\gamma}_{BICM}(P_1),\bar{\gamma}_{BICM}(P_2))\approx\bar{\gamma}_{BICM}(P_1)\bar{\gamma}_{BICM}(P_2).$$

During retransmission, the IR has higher priority than the repetition. The repeated bits are sent only after all the incremental redundant bits that are different from the bit sequence in previous the transmission are sent if $\lambda_1<1$. If $\lambda_1>1$, the repetitions are sent only after all the IR bits that are different from those in the residual part are sent. In other words, a "partially filled bucket" is filled in previous transmission using the residue part in the second transmission. The new bucket is filled only when the previous bucket is fully filled.

Similar to the mixed combining for one transmission block shown in FIG. 4, $\Lambda_1$, $\epsilon_1$ and $\Lambda_2$, $\epsilon_2$ are obtained from $\lambda_I=\Lambda_I+\epsilon_I$, where $\Lambda_I=\lfloor\lambda_I\rfloor$, $\epsilon_I=\lambda_I-\Lambda_I$. There are two cases for two transmissions: the case with $\epsilon_1+\epsilon_2<1$ and the case with $\epsilon_1+\epsilon_2>1$. Based on the above bucket filling assumptions, for both cases the codeword can be divided by three parts.

Figure 6:
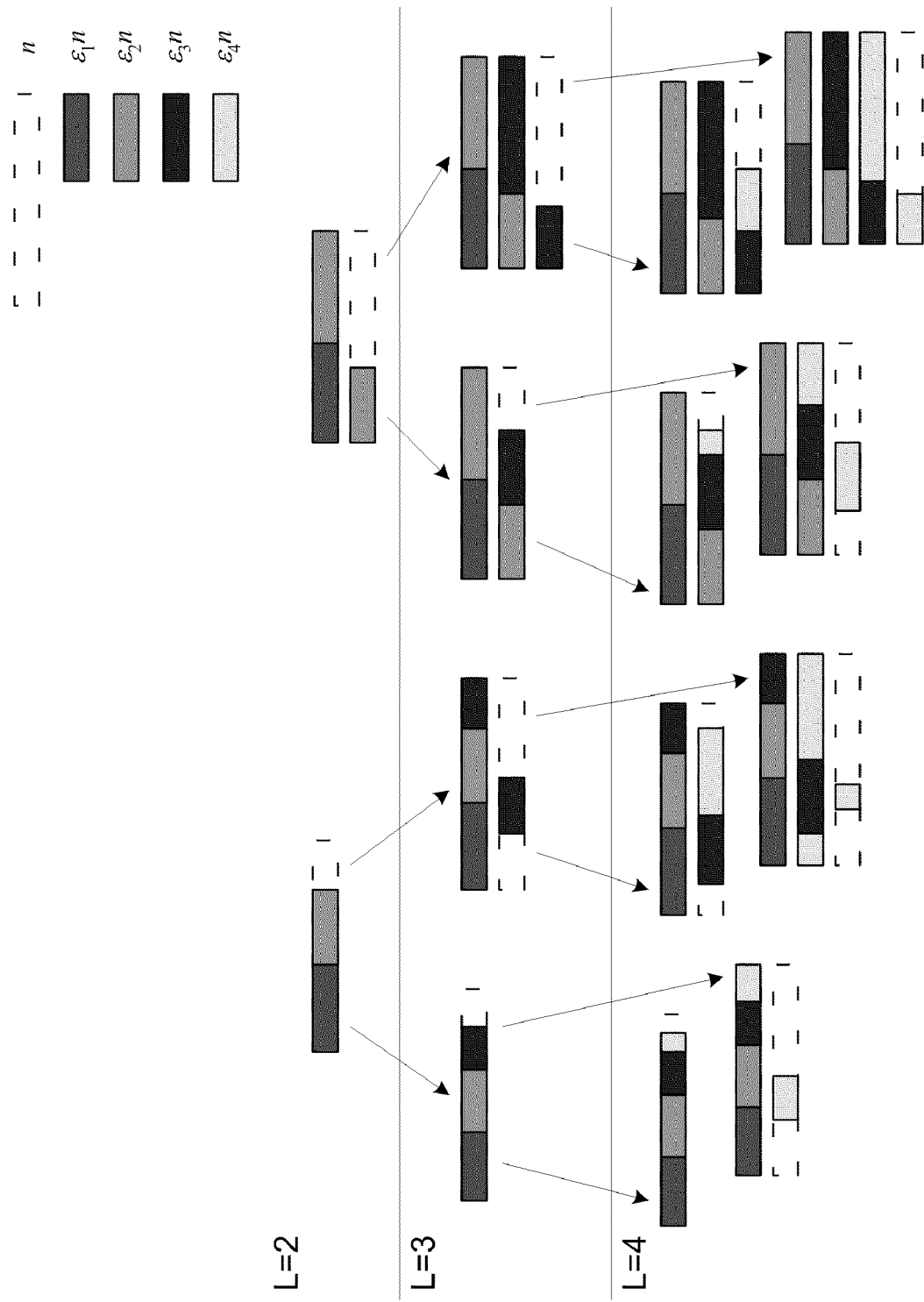
FIG. 6 depicts mixed combining for a number of transmission blocks.

Similar to FIGS. 4 and 5, FIG. 6 depicts mixed combining for a number (e.g., L) of transmission blocks. In the exemplary embodiment of FIG. 6, mixed combining in four transmission blocks is shown. Of course, mixed combining may be generalized to any number (e.g., L) transmission blocks. With the same policies described above with respect to FIG. 5, the general transmission strategy for L transmissions is described. After I-1 transmissions, the bit sequence is sent for the $I^{th}$ transmission as described below with respect to FIG. 7.

Figure 7:
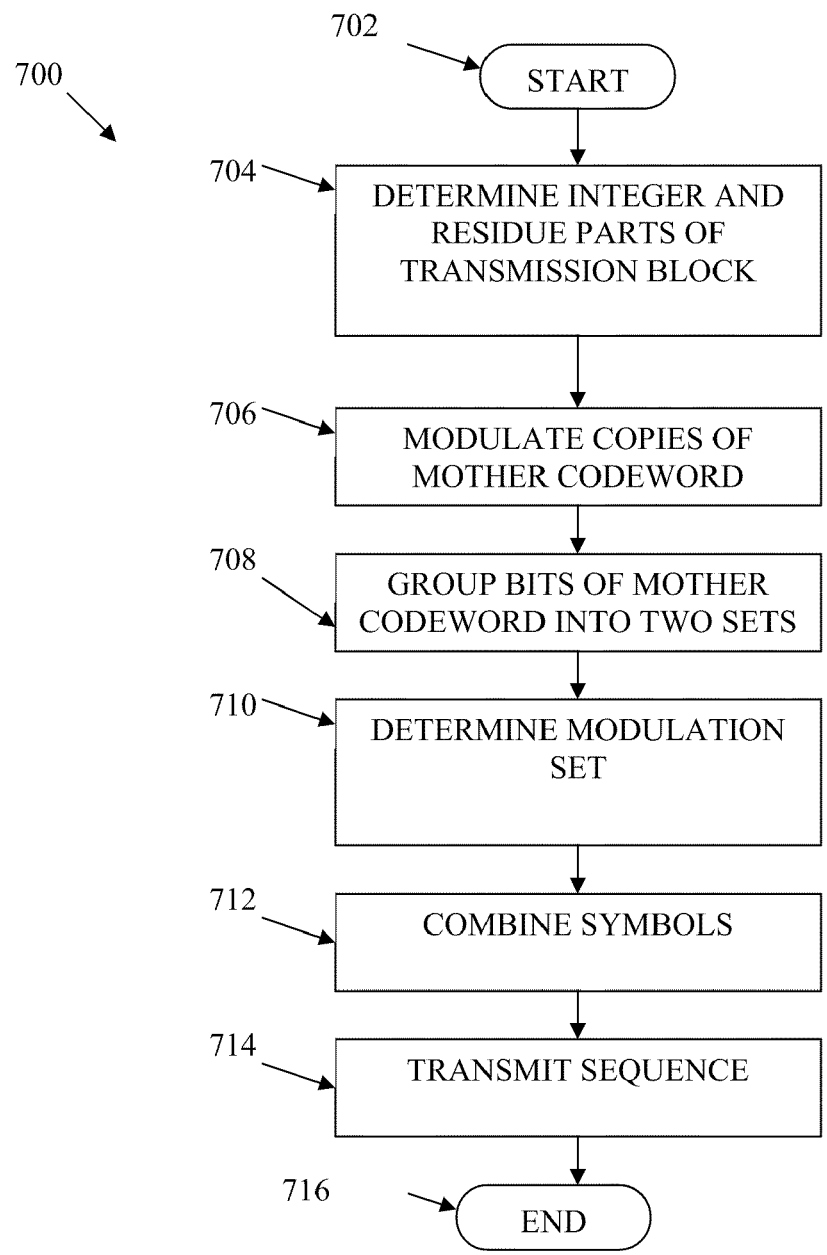
FIG. 7 is a flowchart of a method of transmission with adaptive IR hybrid ARQ according to an embodiment of the present invention.

FIG. 7 is a flowchart of a method 700 of transmission with adaptive IR hybrid ARQ according to an embodiment of the present invention. The transmission method 700 may be performed by wireless transmission system 100, especially controller 106. For example, transmitter 102 is adapted to perform the method 700 as described herein. The method starts at step 702.

In step 704, given $\lambda_I$, obtain $\Lambda_I$ and $\epsilon_1$. That is, given the assignment rate of a transmission, determine the integer part and the residue part of the associated transmission block.

In step 706, $\Lambda_I$ copies of the lengthen mother codeword are modulated into $\Lambda_I(2m_I)M_I$-QAM symbols.

In step 708, n bits from the mother codeword are grouped into two sets—$G_1$ and $G_2$. $S=\Sigma_{i=1}^{I-1}\epsilon_i$ is obtained by finding the combination of all the residual parts in the previous I-1 transmissions. These transmissions contain $\lfloor s\rfloor+1$ full codewords plus $s-\lfloor s\rfloor$ portions of codewords. Then, $(s-\lfloor s\rfloor)n$ bits have been transmitted $\lfloor s\rfloor+1$ times and the remainder have been transmitted $\lfloor s\rfloor+1$ times from the transmission of all I-1 residual parts. The $(s-\lfloor s\rfloor)n$ bits are grouped into the set $G_2$. The rest are grouped into the set $G_1$.

In step 710, the modulation set is determined. $\epsilon_I n$ bits are selected from the set $G_1$ of size $z_1$, where $z_1=n-(s-\lfloor s\rfloor)n$. If $\epsilon_I n>z_1$, all bits in $G_1$ are selected and $\epsilon_I n>z_1$ bits are selected from $G_2$. The selected $\epsilon_I n$ bits are then modulated into $\epsilon_I n/(2m_I)M_I$-QAM symbols.

In step 712, all $M_I$-QAM symbols are combined into a single length-$\lambda_I n/(2m_I)$ sequence. In step 714, the sequence is transmitted (e.g., by transmitter 102) and the method 700 ends at step 716.

Figure 8:
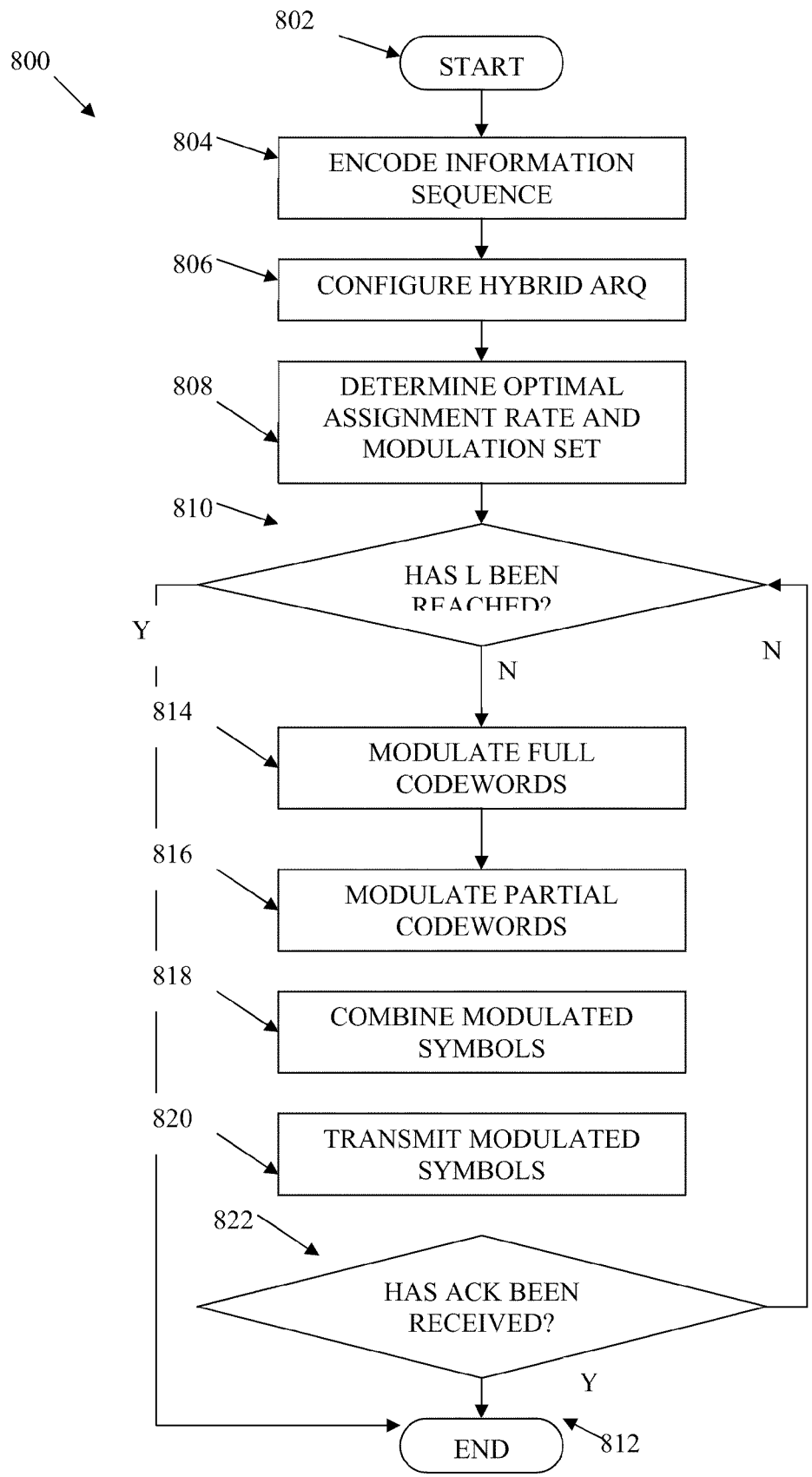
FIG. 8 is a method of mixed transmission according to an embodiment of the present invention.

FIG. 8 is a method 800 of mixed transmission according to an embodiment of the present invention. The method 800 is performed at the transmitter 102 for adaptive hybrid ARQ with mixed combining in turbo coded system with discrete QAM modulations. The method begins at step 802.

In step 804, an information sequence b is encoded by a (n,k) turbo code to form a length-n codeword. Subsequently, in step 806, the hybrid ARQ process is configured. That is, the maximal number of transmissions L is set and the long-term SNR P is determined. The maximum number of transmissions L of an initial transmission, as described above with respect to FIG. 1, may be predetermined, input by a user, or determined in any other appropriate fashion. In at least one embodiment, a long-term signal to noise ratio is received. The SNR P may be received from receivers 104 or from another location. In an alternative embodiment, transmitter 102 determines the SNR P.

In step 808, based on the values of P and L, the transmitter 102 retrieves the optimal assignment rates $\{\lambda_i\}$ and modulations sets $\{M_I\text{-QAM}\}$ for the determined SNR P and maximal number of transmissions L. In at least one embodiment, the rates and modulation sets are retrieved from a memory (e.g., a memory that is part of controller 106). In the same or alternative embodiments, the rates and modulation sets are retrieved from a table. $\{\Lambda_I, \epsilon\}$ is computed by $\Lambda_I=\lfloor\lambda_I\rfloor$, $\epsilon_I=\lambda_I-\Lambda_I$. Methods for determining optimal assignment rates and modulation sets are described above and below with respect to FIGS. 9-11.

In step 810, a determination is made as to whether the maximum number of transmissions has been reached. With the initialization I=1 for the first transmission, the current status of the number of transmissions, I, is determined. If I is greater than L, the method 800 proceeds to step 812 and the method ends. If I is less than or equal to L, the method 800 proceeds to step 814 and the $\Lambda_I$ length-n codewords are modulated into $M_I$-QAM symbols.

In step 812, partial codewords are modulated. As described similarly above with respect to method 700 of FIG. 7, the length-n mother codeword is grouped into two sets, $\Gamma_1$ with size $z_1$ and $\Gamma_2$ with size $(n-z_1)$. $\epsilon_I$ coded bits are selected from set $\Gamma_1$. If $\epsilon_I>z_1$, all bits are chosen from $\Gamma_1$ first and select $\epsilon_I-z_1$ bits are chosen from $\Gamma_2$. All $\epsilon_I$ bits are modulated into $M_I$-QAM symbols.

To form the sets $\Gamma_1$ and $\Gamma_2$, $s=\Sigma_{i=1}^{I-1}\epsilon_i$ is obtained. The combination of all the residual parts in previous I-1 transmissions contains $\lfloor s\rfloor$ full codewords plus $s-\lfloor s\rfloor$ portions of codewords. Then, $(s-\lfloor s\rfloor)n$ bits have been transmitted $\lfloor s\rfloor+1$ times and the rests have been transmitted $\lfloor s\rfloor$ times from the transmissions of all I-1 residual parts. The $(s-\lfloor s\rfloor)$ n bits are then grouped into the set $\Gamma_2$. The remaining bits are grouped into the set $\Gamma_1$.

In step 818, the modulated symbols from steps 814 and 816 are combined to form one sequence. In step 820, a total of $\lambda_I n/\log_2 M_I M_1$-QAM symbols are transmitted (e.g., by transmitter 102).

In step 822, a determination is made as to whether an acknowledgement has been received. If an acknowledgement (ACK) of the transmission from step 820 has been received (e.g., from receiver 104 at transmitter 102), the method proceeds to step 812. That is, if an ACK is received indicating successful decoding of a transmitted message, the method 800 ends at step 812. If a negative acknowledgement (e.g., a NAK) is received or no reply is received, the method 800 returns control to step 810 and retransmission is attempted.

Figure 9:
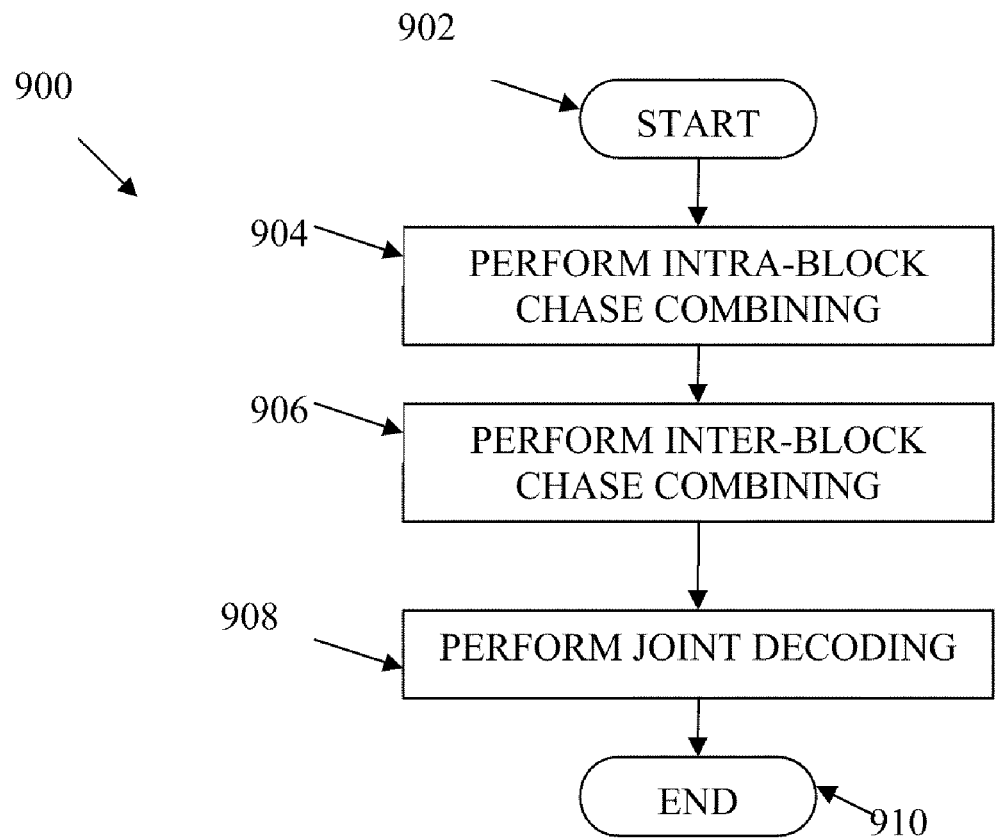
FIG. 9 is flowchart of a method for mixed combining at the receiver according to an embodiment of the present invention.

FIG. 9 is flowchart of a method 900 for mixed combining at the receiver according to an embodiment of the present invention. The method 900 may be performed by wireless transmission system 100, specifically receiver 104. As described above with respect to FIGS. 7 and 8, in hybrid ARQ with Chase combining (CC), the same coded sequence from original transmission is sent to receiver upon the ARQ request. To detect the information, the receiver applies maximum-ratio combining (MRC) for received multiple copies of the coded sequence and then performs decoding based on MRC outputs. In IR based hybrid ARQ, additional parity bits are transmitted during the retransmissions. The receiver performs the decoding directly with all received sequences since they belong to one codeword. The method starts at step 902.

In step 904, intra-block CC is performed. For each transmission (e.g., each transmission from steps 810-822) pre-demodulation MRC is performed for the symbol repetitions in that transmission. Pre-demodulation CC for two portions of codeword is used. That is, maximum ratio combining (MRC) is used for $\Lambda_l+1$ copies of $\epsilon_l$ portion of codeword.

In step 906, inter-block CC is performed. That is, MRC is then used for $\Lambda_i$ copies of the rest $1-\epsilon_l$ portion of codeword. For all I transmissions, a determination is made as to whether there are any coded bits repeated among different transmissions. If modulations for the repetitions among any I transmissions are the same, $i \leq I$, pre-demodulation MRC is performed for all i transmissions. Post-demodulation bit combining is then used for all repeated bits in different transmissions with different modulations.

In step 908, joint decoding is performed for both parts as one turbo codeword. That is, the message is decoded in one decoder using Chase combining and demodulation outputs. The method ends at step 910.

Figure 10:
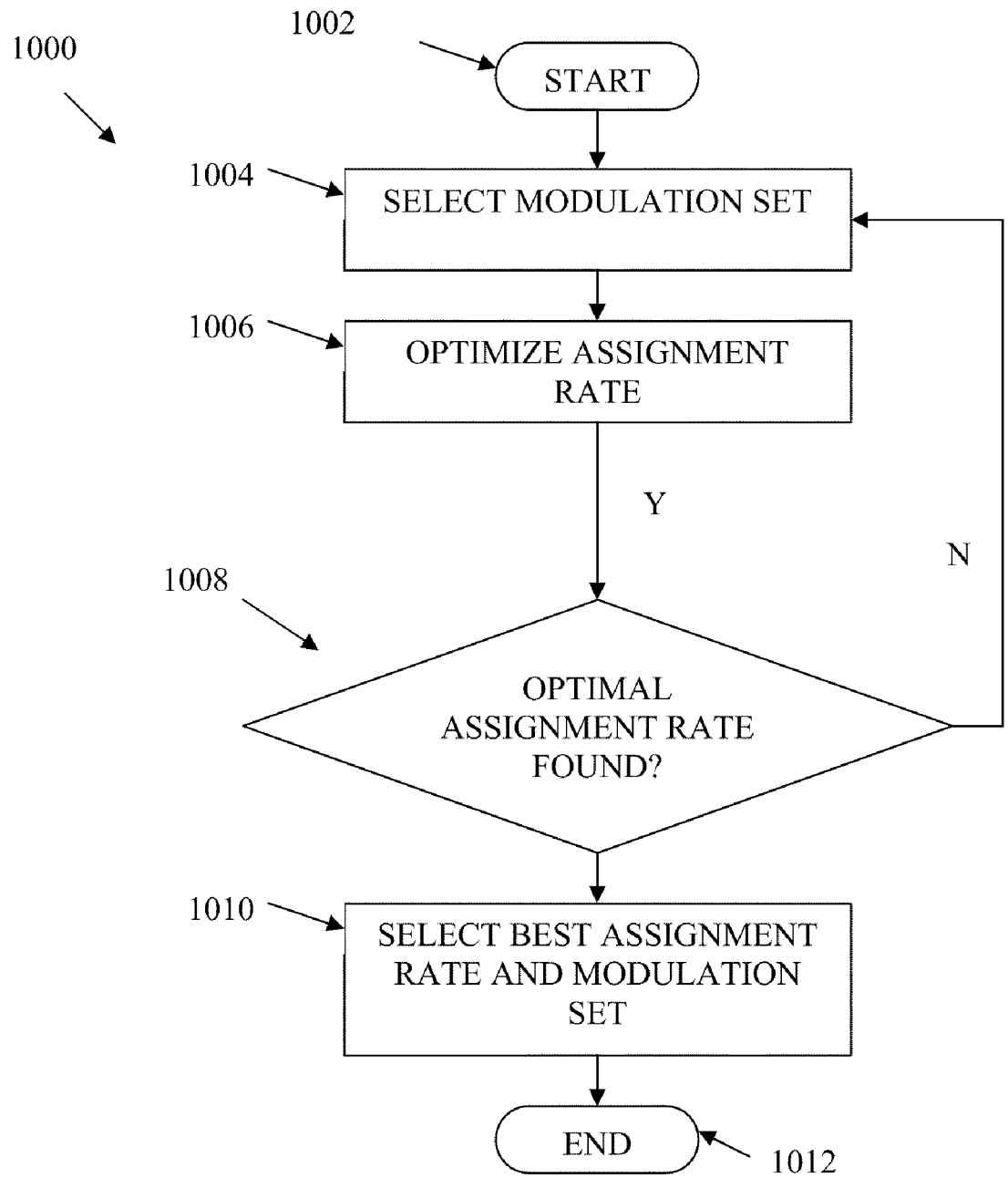
FIG. 10 is a flowchart of a method for two-step optimization for adaptive HARQ with mixed combining employing turbo-coded QAM modulation according to an embodiment of the present invention.

FIG. 10 is a flowchart of a method 1000 for two-step optimization for adaptive HARQ with mixed combining employing turbo-coded QAM modulation according to an embodiment of the present invention. The method 1000 may be performed by wireless transmission system 100, specifically transmitter 102, processor 106, and/or rate assigner 304. Method 1000 is a rate optimization for adaptive hybrid ARQ and may be used in the determination of the optimal rate assignment in step 808 of method 800 above. In other words, method 1000 is for obtaining the optimal assignment rates and modulation set for adaptive hybrid ARQ with mixed combining. The process is for given SNR and L. With this procedure the optimal assignment rates and modulation sets for all SNR and all L are obtained and then used to form the table discussed above with respect to step 808 of method 800. The method 1000 begins at step 1002.

In step 1004, a modulation set is selected. The modulation set $\{M_l\}$ may be from the set of $\{(QPSK, 16QAM, 64QAM)^L\}$.

In step 1006, the assignment rate is maximized for the throughput $\{\lambda_l\}$ for the modulation set selected in step 1004. In at least one embodiment, the assignment rate is maximized using the method 1100 described below with respect to FIG. 11. Of course, other genetic methods (e.g., algorithms) or other algorithms may be used to determine an optimal assignment rate.

In step 1008, a determination is made as to whether the optimal assignment rates have been obtained for all of the modulation set selected in step 1004. If the optimal assignment rates have not been obtained for all of the modulation set selected in step 1004, the method 1000 returns control to step 1004 and a modulation set is selected. If the optimal assignment rates have been obtained for all of the modulation set selected in step 1004, the method proceeds to step 1010 and the set of assignment rates and modulations that correspond to the maximal throughput is selected. That is, the best set of assignment rates and modulations is selected. The method ends at step 1012.

Figure 11:
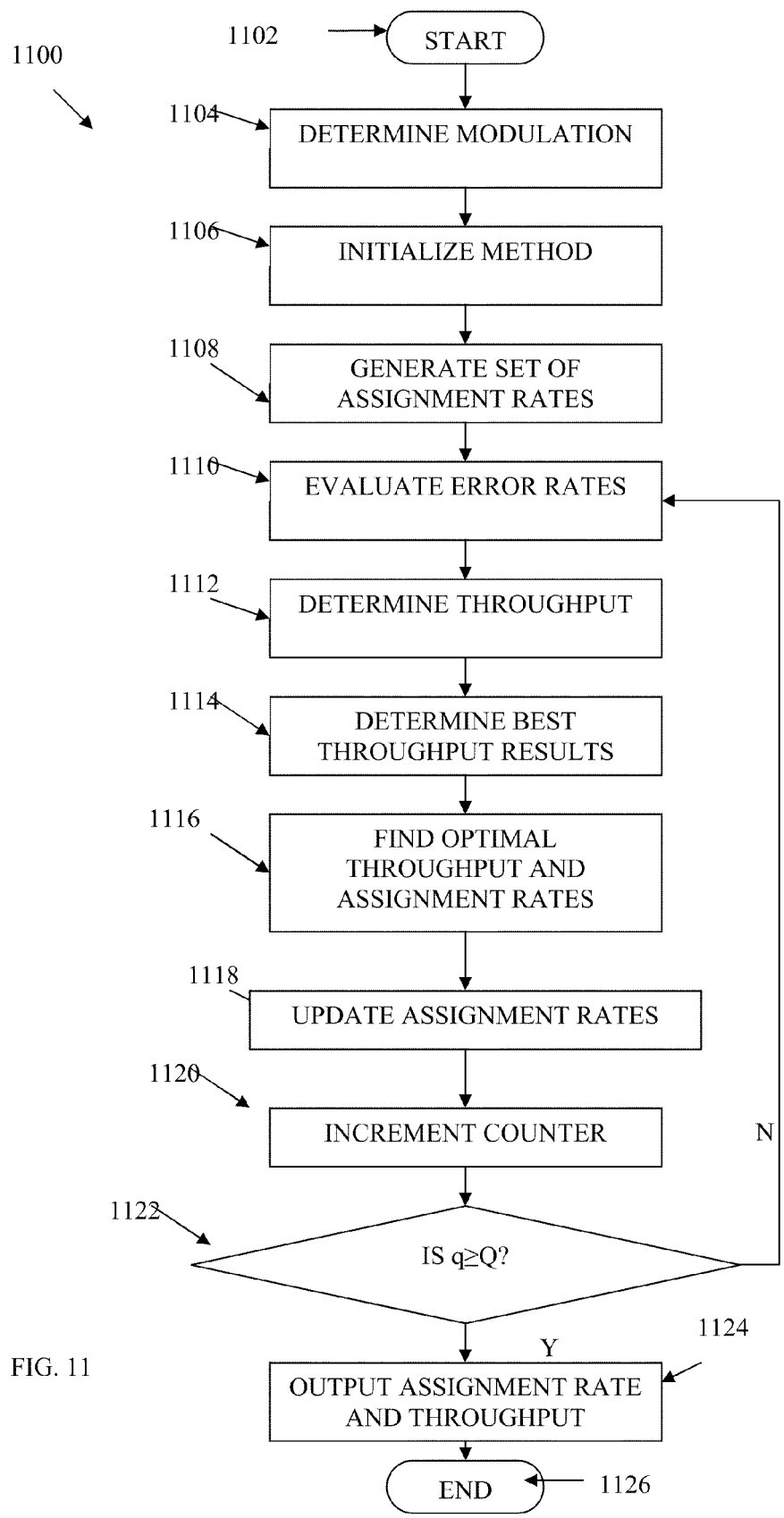
FIG. 11 is a flowchart of a method of maximizing throughput according to an embodiment of the present invention.

FIG. 11 is a flowchart of a method 1100 of maximizing throughput according to an embodiment of the present invention. Method 1100 may, in some embodiments, be used to optimize the assignment rate for the given modulation set to maximize throughput, as in step 1006 of method 1000. Method 1100 is a genetic (e.g., iterative) algorithm to solve rate optimization for adaptive hybrid ARQ. The method 1100 may be performed by wireless transmission system 100, specifically transmitter 102, processor 106, and/or rate assigner 304. Method 1100 begins at step 1102.

In step 1104, a modulation is determined. That is, given a modulation set (e.g., the modulation set selected in step 808 of method 800), $\{M_l\}$ is determined. In step 1106, the method 1100 is initialized. The number of randomized candidates T, the maximal iteration number Q, and step size p are set.

In step 1108, a set of assignment rates is generated. The T set of assignment rates is randomly generated as $\lambda_t^{(q=0)} = [\lambda_{t,1}^{(0)}, \ldots, \lambda_{t,L}^{(0)}]^T$, $t=1, \ldots, T$.

In step 1110, the error rates $\{p_r(l)\}$ are evaluated. Beginning with $q=0$ and given the candidate assignment rate and the modulation set $\{\lambda_{t,1}^{(q)}, m_l\}$, the error rates are evaluated by $p(l) = Pr(\bar{\gamma}_l > \exp(-c_0^{[Cl]}))$ as described above.

In step 1112, the throughput is determined. The throughput may be computed as $$\eta_{TC} = \frac{(1 - p(L))r_0}{\frac{\lambda_1}{2m_1}\left(1 + \sum_{l=1}^{L-1} \frac{\lambda_{l+1}}{2m_{l+1}} p(l)\right)},$$

as described above.

In step 1114, the best throughput results are determined. The throughput results at the current ($q^{th}$) iteration are compared with the results at the previous ($(q-1)^{th}$) iteration. If the throughput is higher in the current iteration than in the previous iteration, the current results are kept. Otherwise, the current throughput and assignment rates are replaced with the previous throughput and assignment rates. That is, if $\eta_t^{(q)} < \eta_t^{(q-1)}$, then $\eta_t^{(q)} \leftarrow \eta_t^{(q-1)}$ and $\lambda_t^{(q)} \leftarrow \lambda_t^{(q-1)}$.

In step 1116, the optimal throughput and corresponding assignment rates are found. The optimal throughput and corresponding assignment rates are found among T candidates such that $\lambda^{*(q)} = \arg\max \eta_t^{(q)}$.

In step 1118, the assignment rates are updated. The assignment rates $\lambda_t^{(q-1)}$ are updated according to $\Delta\lambda_{t,l} = \mu(\lambda_{t_1,l}^{(u)} - \lambda_{t_2,l}^{(q)} + \lambda_{t_3,l}^{(q)} - \lambda_{t_4,l}^{(q)})$ and $\lambda_{t,l}^{(q+1)} = \max\{\lambda^*_l^{(q)} + \Delta\lambda_{t,l}, 0\}$, $l=1, \ldots, L, t=1, \ldots, T$ where $t_1$-$t_4$ are integers randomly chosen from $\{1, \ldots, T\}$. In this way, the optimal assignment rates are randomized and the descendent assignment rates are formed for the $(q+1)^{th}$ iteration.

In step 1120, a counter is incremented so that $q=q+1$. In step 1122, a check is performed to determine if the maximum iteration size has been reached. If the maximum number of iterations has not been reached (e.g., $q<Q$), the method returns control to step 1110, the iteration number is incremented by one, and the error rates are evaluated.

If the maximum number of iterations has been reached (e.g., $q>Q$), the method 1100 proceeds to step 1124 and the optimal assignment rate and throughput are outputted. The optimal assignment rate $\lambda^{*(Q)}$ and throughput result for a given modulation set $\{M_I\}$ (e.g., the modulation set selected in step 808 of method 800 above) is output (e.g., to transmitter 102, processor 106) and may be stored, such as in a table or other look-up. The method ends at step 1126.

One of skill in the art will recognize that, though described above with respect to QAM modulations QPSK, 16QAM, and 64QAM, other modulations could be used. Similarly, method 900 is described above for turbo codes as the binary channel code, but other suitable codes may be used, such as convolutional codes, low-density parity check (LDPC) codes, and any other modulation settings.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of packet transmission in an adaptive hybrid automatic repeat request wireless transmission system with incremental redundancy comprising:
   determining an optimized assignment rate for a packet based at least in part on a maximal number of transmission attempts and a long term signal to noise ration of the wireless transmission system;
   determining an optimized modulation set for the packet based at least in part on the maximal number of transmission attempts and the long term signal to noise ration of the wireless transmission system;
   transmitting information related to the packet based at least in part on the determined optimized assignment rate and determined optimized modulation set; and
   decoding the information by performing mixed combining for one or more transmission blocks at a receiver.

2. The method of claim 1 wherein determining an optimized modulation set for the packet based at least in part on the maximal number of transmission attempts and the long term signal to noise ration of the wireless transmission system and transmitting information related to the packet based at least in part on the determined optimized assignment rate and determined optimized modulation set comprises:
   determining one or more integer parts of one or more transmission blocks;
   determining one or more residue parts of the one or more transmission blocks;
   modulating a plurality of copies of a mother codeword;
   grouping a plurality of bits of the mother codeword into a first set and a second set;
   determining a modulation set; and
   combining a plurality of symbols in the modulation set into a single sequence.

3. The method of claim 2 further comprising:
   obtaining an assignment rate of transmission; and
   wherein determining the one or more integer parts of the one or more transmission blocks and determining the one or more residue parts of the one or more transmission blocks is based at least in part on the obtained assignment rate of transmission.

4. The method of claim 2 wherein modulating the plurality of copies of a mother codeword comprises:
   modulating a plurality of copies of a mother codeword that is equal to a number of the one or more integer parts of the one or more transmission blocks.

5. The method of claim 4 wherein modulating the plurality of copies of a mother codeword comprises:
   modulating the plurality of copies of the mother codeword into a plurality of symbols.

6. The method of claim 2 wherein determining the modulation set comprises:
   modulating the modulation set into a plurality of symbols.

7. The method of claim 2 further comprising:
   transmitting the single sequence.

8. The method of claim 1 wherein transmitting information related to the packet based at least in part on the determined optimized assignment rate and determined optimized modulation set comprises:
   (a) encoding an information sequence with a turbo code to form a codeword;
   (b) configuring a hybrid automatic repeat request method;
   (c) determining an optimal assignment rate;
   (d) determining a modulation set;
   (e) modulating the codeword into a first plurality of symbols;
   (f) modulating a portion of the codeword into a second plurality of symbols;
   (g) combining the first plurality of modulated symbols and the second plurality of modulated symbols into a sequence; and
   (h) transmitting the sequence.

9. The method of claim 8 wherein configuring the hybrid automatic repeat request method comprises:
   determining a maximum number of transmissions; and
   determining a long-term signal to noise ratio P.

10. The method of claim 8 wherein determining the optimal assignment rate and determining the modulation set comprises retrieving the optimal assignment rate and determining the modulation set from a memory.

11. The method of claim 8 wherein determining the optimal assignment rate and determining the modulation set comprises retrieving the optimal assignment rate and determining the modulation set from a table.

12. The method of claim 8 wherein modulating the codeword comprises:
    modulating a plurality of copies of the codeword;
    grouping a plurality of bits of the codeword into a first set and a second set; and
    modulating a plurality of bits of the first set into a plurality of symbols.

13. The method of claim 8 further comprising:
    determining if a negative acknowledgement is received;
    if a negative acknowledgement is received, determining if a maximum number of transmissions have been sent; and
    if the maximum number of transmissions has not been sent, iteratively performing steps (e)-(h).

14. The method of claim 8 further comprising:
    determining if an acknowledgement is received;
    if an acknowledgement has not been received, determining if a maximum number of transmissions have been sent; and
    if the maximum number of transmissions has not been sent, iteratively performing steps (e)-(h).

15. The method of claim 1 wherein decoding the information by performing mixed combining for one or more transmission blocks at the receiver comprises:

performing Chase combining on an intra-block portion of a received transmission block;
performing Chase combining on an inter-block portion of the received transmission block; and
jointly decoding both the intra-block portion and the inter-block portion as one turbo codeword.

16. The method of claim 15 wherein performing Chase combining on an intra-block portion of a received transmission block comprises:

performing pre-demodulation maximum ratio combining on symbol repetitions of the received transmission block; and
performing pre-demodulation Chase combining for a first portion of a codeword and a second portion of the codeword.

17. The method of claim 15 wherein performing Chase combining on an inter-block portion of the received transmission block comprises:

maximum ratio combining the inter-block portion of the received transmission block.

18. The method of claim 15 wherein jointly decoding both the intra-block portion and the inter-block portion as one turbo codeword comprises:

decoding the received transmission block in one decoder using Chase combining and demodulation outputs.

* * * * *